United States Patent
Manner et al.

(10) Patent No.: US 9,713,850 B2
(45) Date of Patent: Jul. 25, 2017

(54) REAMING TOOL AND ADJUSTING SCREW FOR A FINE ADJUSTMENT MECHANISM, IN PARTICULAR FOR A REAMING TOOL

(75) Inventors: Heinrich Georg Manner, Guteneck (DE); Rene Schwarznau, Schwarzhofen (DE); Xaver Franz Spichtinger, Oberviechtach (DE); Armin Josef Zimmermann, Oberviechtach (DE)

(73) Assignee: KENNAMETAL INC., Latrobe, PA (US)

( * ) Notice: Subject to any disclaimer, the term of this patent is extended or adjusted under 35 U.S.C. 154(b) by 213 days.

(21) Appl. No.: 14/344,098

(22) PCT Filed: Sep. 13, 2012

(86) PCT No.: PCT/EP2012/067997
§ 371 (c)(1),
(2), (4) Date: Sep. 8, 2014

(87) PCT Pub. No.: WO2013/037916
PCT Pub. Date: Mar. 21, 2013

(65) Prior Publication Data
US 2015/0030404 A1    Jan. 29, 2015

(30) Foreign Application Priority Data
Sep. 13, 2011  (DE) .................. 10 2011 112 952

(51) Int. Cl.
*B23D 77/04* (2006.01)
*B23B 29/034* (2006.01)
*F16B 35/00* (2006.01)

(52) U.S. Cl.
CPC ...... *B23D 77/044* (2013.01); *B23B 29/03403* (2013.01); *B23D 77/048* (2013.01);
(Continued)

(58) Field of Classification Search
CPC ......... Y10T 407/1912; Y10T 407/1914; Y10T 407/1916; Y10T 407/1918; Y10T 407/192;
(Continued)

(56) References Cited
U.S. PATENT DOCUMENTS
1,320,482 A    11/1919 Lenker
3,195,376 A *  7/1965 Bader .................. B23C 5/2441
407/49
(Continued)

FOREIGN PATENT DOCUMENTS
CH    131 155 A    1/1929
CN    1233201 C    12/2005
(Continued)

OTHER PUBLICATIONS
Machine Translation of JP 2001-121318 foreign reference, pp. 5-10, Dec. 8, 2015.*
(Continued)

*Primary Examiner* — Sunil K Singh
*Assistant Examiner* — Nicole N Ramos
(74) *Attorney, Agent, or Firm* — Ian K. Samways

(57) ABSTRACT

A reaming tool includes a main tool body disposed about a rotational axis, a plurality of peripherally arranged cutting inserts coupled to the tool body, and a fine adjustment mechanism associated with each cutting insert. The adjustment mechanism includes an adjusting screw with a conical section that acts on the cutting insert for fine adjustment, the conical section being arranged between a first and a second cylindrical guide section. The two guide sections ensure high-precision guidance of the adjusting screw.

23 Claims, 2 Drawing Sheets

(52) U.S. Cl.
CPC ...... *F16B 35/005* (2013.01); *B23D 2277/088* (2013.01); *Y10T 408/858* (2015.01); *Y10T 408/8588* (2015.01)

(58) Field of Classification Search
CPC ......... Y10T 407/1922; Y10T 407/1928; Y10T 407/193; Y10T 408/858; Y10T 408/8588; B23B 29/00; B23C 5/2472; B23C 5/2479; B23C 5/24; B23D 77/044; B23D 77/048; B23D 77/046
USPC .................. 407/36–41, 44, 45; 408/153, 173
See application file for complete search history.

(56) References Cited

U.S. PATENT DOCUMENTS

| | | | | |
|---|---|---|---|---|
| 3,792,517 | A * | 2/1974 | Gage | B23C 5/2441 407/37 |
| 5,853,271 | A * | 12/1998 | Schanz | B23B 51/06 407/38 |
| 6,942,431 | B2 * | 9/2005 | Pantzar | B23C 5/2462 407/36 |
| 7,014,393 | B2 * | 3/2006 | Matheis | B23B 27/1681 407/37 |
| 7,114,890 | B2 * | 10/2006 | Noggle | B23C 5/2441 407/36 |
| 8,092,124 | B2 * | 1/2012 | Spichtinger | B23C 5/006 407/11 |
| 8,961,074 | B2 * | 2/2015 | Choi | B23C 5/06 407/37 |
| 2003/0202848 | A1 * | 10/2003 | Gamble | B23C 5/08 407/36 |
| 2005/0254907 | A1 * | 11/2005 | Bader | B23C 5/2406 407/36 |
| 2010/0215445 | A1 * | 8/2010 | Chen | B23B 27/1622 407/36 |
| 2010/0232890 | A1 * | 9/2010 | Hughes | B23C 5/06 407/110 |
| 2010/0316453 | A1 * | 12/2010 | Bronshteyn | B23C 5/2462 407/44 |

FOREIGN PATENT DOCUMENTS

| | | | |
|---|---|---|---|
| CN | 101460277 B | | 9/2010 |
| DE | 386 659 C | | 12/1923 |
| GB | 2 110 129 A | | 6/1983 |
| GB | 2110129 A | | 6/1993 |
| JP | 8039325 | | 2/1996 |
| JP | 2001121318 A | * | 5/2001 |
| JP | 2004136428 A | * | 5/2004 |
| JP | 2006 102924 A | | 4/2006 |
| JP | 2006102924 A | | 4/2006 |
| JP | 2006159350 A | * | 6/2006 |
| WO | 2005/107987 A1 | | 11/2005 |

OTHER PUBLICATIONS

Aug. 25, 2015 First office action 103796783.
Apr. 29, 2016—Second Office Action—K-04034-CN-PCT.

* cited by examiner

A-A
2 : 1

REAMING TOOL AND ADJUSTING SCREW FOR A FINE ADJUSTMENT MECHANISM, IN PARTICULAR FOR A REAMING TOOL

BACKGROUND OF THE INVENTION

The invention relates to a reaming tool comprising a rotation axis, having a main tool body with a plurality of circumferentially arranged cutting inserts and having a fine setting mechanism assigned to each particular cutting insert, said fine setting mechanism comprising a setting screw having a conical portion which acts on the cutting insert for fine setting. The invention furthermore relates to a setting screw, in particular for such a reaming tool.

A reaming tool of this type can be gathered for example from U.S. Pat. No. 3,286,557. Reaming tools are used generally for high-precision machining of drilled holes. In the case of reaming tools having exchangeable cutting inserts, high-precision radial fine setting of the individual cutting inserts, that is to say high-precision setting of the nominal diameter, is necessary.

In U.S. Pat. No. 3,286,557, two setting screws, which comprise a conical portion at their ends, are provided for the radial fine setting of a cutting tip. The conical portion interacts with the cutting tip. When the setting screw is screwed in, as a result of the conical configuration, the cutting tip is displaced in the radial direction for fine setting.

In addition to such reaming tools provided with cutting inserts, reaming tools with soldered-in cutting inserts are also known. In order to improve the service life, such reaming tools are provided with a (hard material) coating in order to increase the surface hardness. However, in this case the problem arises that a change in the position of the cutting inserts on account of the high temperatures that occur during the coating can occur as a result of softening of the solder.

OBJECT OF THE INVENTION

Against this background, the invention is based on the object of allowing improved fine setting in reaming tools.

ACHIEVEMENT OF THE OBJECT

The object is achieved according to the invention by a reaming tool having the features of claim 1. For high-precision, in particular radial fine setting, provision is made for the conical portion to be arranged between a first and a second cylindrical guide portion.

Therefore, the conical portion is guided along the screw longitudinal axis in a highly precise manner with the aid of the two cylindrical guide portions. On account of this double-sided guidance of the conical portion, high-precision fine setting is allowed, without this being impaired for example by elastic yielding of the conical portion. The guide portions have in this case a sufficient axial length and are for example the same size or different sizes.

Preferably, guide bores are provided in a manner corresponding to the guide portions in the main tool body, the guide portions being guided in a sliding manner with a precise fit and without play in said guide bores, in particular such that they are not in contact with the cutting insert. Only the conical portion is operatively connected directly or indirectly to the cutting insert, in order to move the latter as desired in the radial direction. The guide bores are in this case introduced into the end side of the main tool body approximately in the axial direction, that is to say in the direction of the rotation axis. On account of the highly precise interplay of the guide portions with the guide bores, the setting screw is mounted as a whole without play and in a sliding manner, such that high-precision fine setting is ensured.

The cutting inserts are in this case formed preferably from carbide or as sintered materials and/or are furnished with diamond or CBN or are in the form of cermets.

The main tool body itself is formed for example from a suitable tool steel. The cutting inserts are provided preferably with a suitable coating in order to increase the surface hardness. Preferably, only the cutting inserts and not the main tool body are coated.

Preferably, the setting screw comprises a screw head, which forms the first cylindrical guide portion by way of the lateral surface.

Preferably, the screw head has in this case the largest diameter. The conical portion adjoins the screw head in particular directly and narrows in the direction of the screw axis.

Expediently, the second cylindrical guide portion, which follows the conical portion at the narrowed end thereof, has a smaller diameter than the conical portion at its narrowed end. In particular, the second cylindrical guide portion is set back radially with respect to the narrowed end of the conical portion. Alternatively, the second guide portion has the same diameter as the conical portion at its narrowed end.

Furthermore, provision is expediently made for an annular groove to be arranged between the lower narrowed end of the conical portion and the second guide portion.

The second cylindrical guide portion is preferably adjoined, likewise with an annular groove arranged in between, by a thread, in particular a fine thread, which interacts with a corresponding mating thread in the main tool body.

In an expedient embodiment, the setting screw is formed in one piece, and is thus not assembled from a plurality of components. This allows a high-precision configuration of the setting screw.

The conical portion in this case expediently defines a cone angle which is approximately in the range from 1° to 6°. This small cone angle allows very fine radial adjustment, in particular also in interaction with the fine thread.

Expediently, the setting screw is furthermore arranged in a manner inclined at an inclination angle with respect to the rotation axis. The inclination angle is in this case preferably in the range from 0° to 5° and in particular in the range from 0.5° to about 1°. The screw longitudinal axis is in this case located within a radial plane which is defined by the rotation axis and a radial to the rotation axis.

On account of this inclination, the fine-setting capability is further improved. The fine thread, the cone angle and the inclination angle of the screw longitudinal axis interact in such a way as to allow the desired (radial) adjustment travel. The entire (radial) adjustment range is in this case preferably in the range between 0.05 and 0.1 mm. In principle, other adjustment ranges can also be set.

Expediently, provision is made in this case for a radial adjustment travel in the range from merely 0.005 to 0.015 mm to be achieved per revolution of the setting screw. Overall, high-precision fine adjustment can be achieved as a result. A radial adjustment travel is understood to mean the displacement of the cutting edge of the cutting insert in the radial direction with respect to the rotation axis.

In a preferred configuration, the screw longitudinal axis is inclined away from the rotation axis, starting from the screw head, and therefore the screw longitudinal axis becomes farther away from the rotation axis with increasing distance from the end side of the main tool body. As a result of this measure, the screw head and thus the first cylindrical guide surface are as it were tilted away from the cutting insert, and as a result contact of the screw head with the cutting insert is reliably avoided even in the event of adjustment, that is to say screwing in of the setting screw. The only contact occurs via the conical portion.

Preferably, the conical portion rests in this case directly against the cutting insert. In principle, a configuration with indirect action on the cutting insert is also possible, if the latter is arranged for example in a cassette.

In order to fix the axial position of the cutting insert, a further setting element, in particular a locating pin is provided in an expedient development. Said locating pin is introduced into a corresponding radial bore in the main tool body. As an alternative to the locating pin, a setting screw can also be used for axial setting, in particular in the configuration described, as is used for radial fine setting. As an alternative to the further setting element, the tip seat is formed in a sufficiently highly precise manner, for example with the aid of an erosion method. In this case, the further setting element, that is to say an additional axial stop, is dispensed with.

In order to reliably hold the cutting insert in the main tool body, said cutting insert is pressed in a preferred configuration in the circumferential direction against a tip seat with the aid of a clamping wedge. Expediently, provision is made in this case for the cutting insert to be held in a form-fitting manner by the clamping wedge. Therefore, a form fit is formed in the axial direction between the cutting insert and the clamping wedge. In order to achieve this, provision is made in particular for the cutting insert to be formed in an angled manner at least on the side facing the clamping wedge, such that it engages behind the clamping wedge, in particular one wedge side thereof.

DESCRIPTION OF THE FIGURES

An exemplary embodiment is explained in more detail in the following text with reference to the figures, in which.

Figure 1:
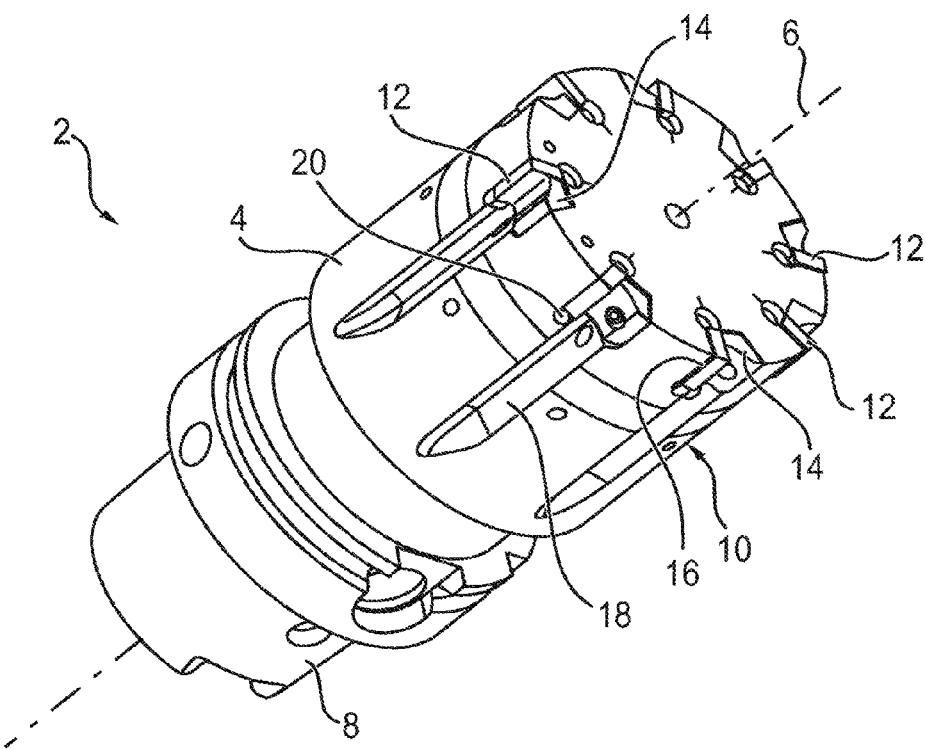
FIG. 1 shows a perspective illustration of a reaming tool.

In the figures, parts having an identical effect are provided with the same reference signs.

DESCRIPTION OF THE EXEMPLARY EMBODIMENT

In the exemplary embodiment, the reaming tool 2 comprises a main tool body 4, which extends along a rotation axis 6. At its rear end, it has a coupling 8 for reversibly fastening to a machine spindle of a machine tool. At its front end, the main tool body 4 has a tool head 10 having a planar end face in the exemplary embodiment. In the region of the end face, a plurality of cutting inserts 12 in the form of exchangeable cutting tips are inserted circumferentially into corresponding recesses in the main tool body 4. The cutting inserts 12 protrude both in the radial direction and in the axial direction beyond the main tool body 4 and thus form cutting lips both circumferentially and on the end side. In this case, the cutting inserts 12 are pressed in the circumferential direction against a tip seat 16 with the aid of a clamping wedge 14. In the direction of the rotation axis, the cutting inserts 12 are adjoined by a flute 18, which extends in a rectilinear manner with respect to the rotation axis 6 in the exemplary embodiment.

The precise axial position of the cutting insert 12, that is to say the precise positioning of the end-side cutting lip of the cutting insert 12 is fixed in the exemplary embodiment with the aid of a locating pin 20, which is introduced in each case in the radial direction into a corresponding locating bore 22 (cf. FIG. 5) in the main body.

Fine setting in the radial direction takes place by means of a specifically designed setting screw 24, which can be actuated from the end side with the aid of a suitable tool.

Figure 3:
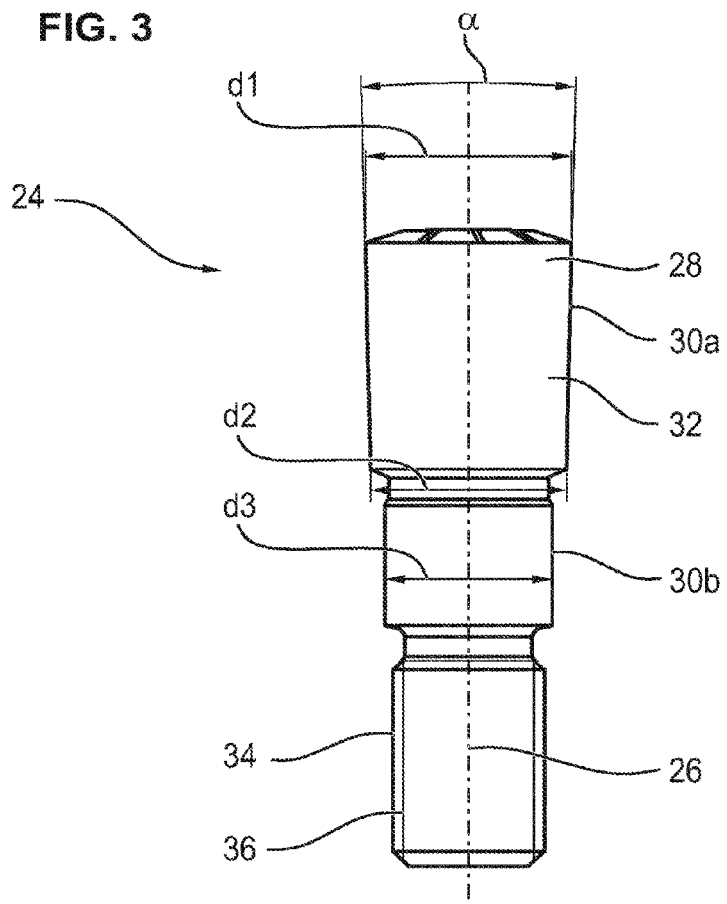
FIG. 3 shows a side view of a setting screw.
Figure 4:
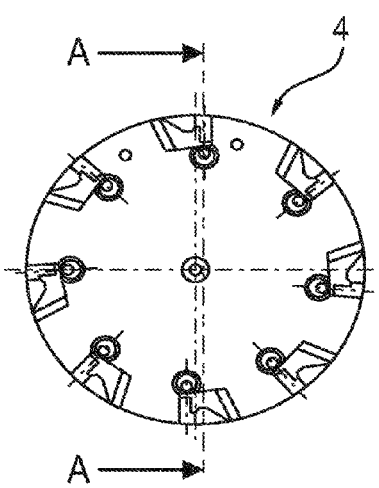
FIG. 4 shows an end view of the main tool body of the reaming tool according to FIG. 1 (without setting screws, cutting inserts and without clamping wedges)

The specific configuration of the setting screw 24 is apparent in particular from FIG. 3. According to said figure, the setting screw 24 extends in the direction of a screw longitudinal axis 26. The setting screw 24 has at its top end a screw head 28 having a cylindrical lateral surface which defines a first cylindrical guide surface 30a. In the region of the cylindrical first guide surface 30a, the setting screw 24 has its maximum diameter d1. A conical portion 32 directly adjoins the first cylindrical guide surface 30a. The conical portion 32 has in this case a cone angle α which is preferably in the range between 1° and 6°. At its top end, the conical portion 32 has the same outside diameter as the first cylindrical guide surface 30a. The conical portion 32 narrows to the diameter d2.

In the exemplary embodiment, the conical portion 32 is first of all adjoined by an annular groove, before a second cylindrical guide surface 30b is provided in continuation. The latter has a diameter d3, which is smaller in the exemplary embodiment than the diameter d2 at the narrowed end of the conical portion 32.

A further annular groove is adjoined finally at the bottom end of the setting screw 24 by a threaded portion 34 having a thread 36 configured in particular as a fine thread.

Figure 5:
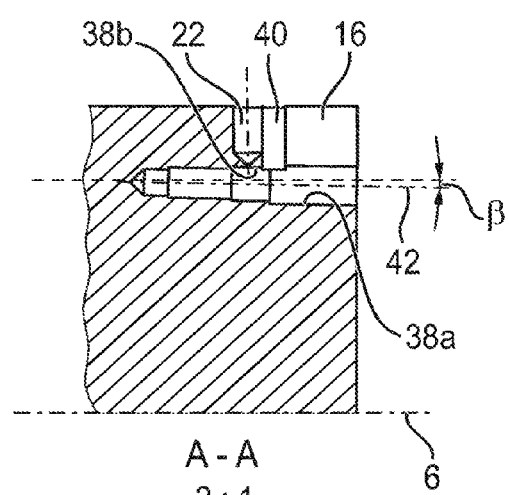
FIG. 5 shows a partial illustration of the section A-A according to FIG. 4 in a twofold enlargement.

As is apparent in particular from FIG. 5, the main tool body is formed in a manner corresponding to the setting screw 24 and has a top, first guide bore 38a, and a second bottom guide bore 38b. In the exemplary embodiment, these have a common center axis. As can be seen, the top first guide bore 38a extends along a comparatively long length, in particular along the entire length of the receptacle in the main tool body 4, in which the cutting insert 12 is inserted. Thus, the guide surface 38a extends over a much greater axial range than the cylindrical guide surface 30a. Accordingly, the conical portion 32 is also located within this upper first guide bore 38a, without, however, said conical portion 32 coming into contact with the first guide bore 38a.

Following the bottom guide bore 38b, a further internal thread (not illustrated in more detail in FIG. 5) is incorporated. Furthermore, the tip seat 16 arranged in the circumferential direction can be seen clearly in FIG. 5, said tip seat 16 being adjoined in the direction of the rotation axis by an undercut 40, before the locating bore 22 is formed.

Figure 2:
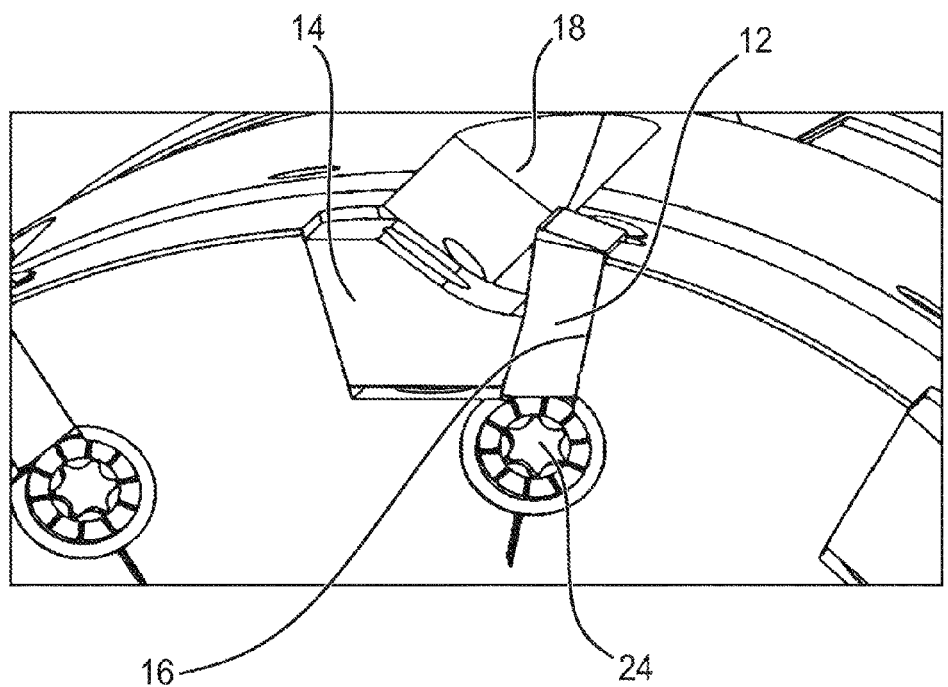
FIG. 2 shows an enlarged detail in the region of the end side of the reaming tool according to FIG. 1.

As can be gathered in particular from the enlarged illustration in FIG. 2, the respective cutting insert 12 is pressed against the tip seat 16 with the aid of the clamping insert 14. The clamping wedge 14 is in this case tightened in the radial direction against the main tool body 4 by means of a screw. The clamping wedge 14 has in this case opposite wedge surfaces. With one wedge surface, the clamping wedge 14 rests against a corresponding wedge surface of the main tool body 4. When the clamping wedge 14 is tightened, a clamping force acting in the circumferential direction is thus exerted on the cutting insert 12.

In order, in addition to the clamping force, to ensure that the cutting insert 12 is secured, the cutting insert 12 likewise has, in its bottom portion that is oriented radially inwardly towards the rotation axis 6, a wedge surface, and thus is to this extent formed in an angled manner. As a result, a rear-engagement means is formed between the one wedge surface of the clamping wedge 14 and the bottom subregion of the clamping insert 12. As a result, as a whole, the cutting insert 12 is held in a form-fitting manner in the radial direction with the aid of the clamping wedge 14. Thus, the cutting insert 12 is held reliably at the desired position even when loaded.

For radial fine setting, the setting screw is adjusted. In the process, the conical portion 32 slides along the rear end side of the cutting insert 12 and displaces the latter in the radial direction into the desired position. In this position, it is secured against falling out by the clamping wedge 14. As a result of the selected configuration having the angled cutting insert, a force acting in the radial direction is exerted on the cutting insert 12 via the angled surface and simultaneously via the clamping wedge 14, such that said cutting insert 12 is pressed against the conical portion 32 and so highly precise abutment without play is ensured.

As can additionally be gathered from FIG. 5, a bore axis 42 of the bore, introduced into the main tool body 4, for the setting screw 24 is arranged in a manner inclined at an inclination angle β with respect to the rotation axis 6. The inclination angle β is in this case preferably in the range between 0° and 5° and in particular in the range between 0.5° and 1°. As can be gathered from FIG. 5, the bore axis 42 is oriented such that its distance from the rotation axis 6 increases, starting from the end side of the main tool body 4.

The inclination of the bore axis 42, the cone angle α and the fine thread are coordinated with one another such that, during one revolution of the setting screw 24 (through 360°), a radial adjustment travel is brought about which is merely in the range from 0.005 to 0.015 mm. As a whole, this allows a highly precise and very fine setting capability for the cutting insert 12.

The invention claimed is:

1. A reaming tool comprising:
    a main tool body disposed about a rotation axis;
    a plurality of circumferentially arranged cutting inserts coupled to the tool body;
    a guide bore assigned to each particular cutting insert; and
    a fine setting mechanism assigned to each particular cutting insert, the fine setting mechanism being disposed in a guide bore and comprising a setting screw having a conical portion which rests directly against the cutting insert and acts on the cutting insert for fine setting, wherein the conical portion is arranged between a first and a second cylindrical guide portion;
    wherein the first and second cylindrical guide portions are adapted to guide the setting screw in a sliding manner within the guide bore;
    the fine setting mechanism comprising the following features (a) and (b):
        (a) the conical portion defining a cone angle which is approximately in the range from 1° to 6°; and
        (b) the setting screw having a screw longitudinal axis which is located within a radial plane and is arranged in a manner inclined at an inclination angle in the range from 0.5 to 5° with respect to the rotation axis; and
    the fine setting mechanism having a first annular groove disposed between the conical portion and the second cylindrical guide portion.

2. The reaming tool as claimed in claim 1, wherein the setting screw has a screw head which forms the first cylindrical guide portion.

3. The reaming tool as claimed in claim 1, wherein the second cylindrical guide portion has a smaller diameter than the conical portion.

4. The reaming tool as claimed in claim 1, wherein a thread adjoins the second cylindrical guide portion.

5. The reaming tool as claimed in claim 1, wherein the setting screw is formed in one piece.

6. The reaming tool as claimed in claim 1, wherein the screw longitudinal axis is inclined away from the rotation axis, starting from the screw head.

7. The reaming tool as claimed in claim 1, further comprising a feature (c), wherein an adjustment travel in the range from 0.005 to 0.015 mm is achieved during one revolution of the setting screw.

8. The reaming tool as claimed in claim 1, wherein, in order to fix an axial position of the cutting insert, a further setting element is provided.

9. The remaining tool as claimed in claim 1, wherein the cutting insert is pressed in the circumferential direction against a tip seat with the aid of a clamping element.

10. The reaming tool as claimed in claim 9, wherein the cutting insert is held in a form-fitting manner by the clamping element.

11. A setting screw for a fine setting mechanism for a reaming tool as claimed in claim 1 comprising the conical portion which is arranged between the first and the second cylindrical guide portion.

12. The reaming tool as claimed in claim 8, wherein the further setting element comprises a locating pin.

13. The reaming tool as claimed in claim 9, wherein the clamping element comprises a clamping wedge.

14. The reaming tool as claimed in claim 1, wherein:
    the fine setting mechanism has a thread;
    the second cylindrical guide portion is disposed between the first annular groove and the thread; and
    the fine setting mechanism has a second annular groove disposed between the second cylindrical guide portion and the thread.

15. A reaming tool comprising:
    a main tool body disposed about a rotation axis;
    a plurality of circumferentially arranged cutting inserts coupled to the tool body;
    a guide bore assigned to each particular cutting insert; and
    a fine setting mechanism assigned to each particular cutting insert, the fine setting mechanism being disposed in a guide bore and comprising a setting screw having a conical portion which rests directly against the cutting insert and acts on the cutting insert for fine setting, wherein the conical portion is arranged between a first and a second cylindrical guide portion;
    wherein the first and second cylindrical guide portions are adapted to guide the setting screw in a sliding manner within the guide bore;
    the fine setting mechanism comprising the following features (a) and (b):
        (a) the conical portion defining a cone angle which is approximately in the range from 1° to 6°; and
        (b) the setting screw having a screw longitudinal axis which is located within a radial plane and is arranged in a manner inclined at an inclination angle in the range from 0.5 to 5° with respect to the rotation axis;

wherein, in order to fix an axial position of the cutting insert, a further setting element is provided; and wherein the further setting element comprises a locating pin.

16. The reaming tool as claimed in claim 15, wherein the setting screw has a screw head which forms the first cylindrical guide portion.

17. The reaming tool as claimed in claim 15, wherein the second cylindrical guide portion has a smaller diameter than the conical portion.

18. The reaming tool as claimed in claim 15, wherein a thread adjoins the second cylindrical guide portion.

19. The reaming tool as claimed in claim 15, wherein the setting screw is formed in one piece.

20. The reaming tool as claimed in claim 15, wherein the screw longitudinal axis is inclined away from the rotation axis, starting from the screw head.

21. The reaming tool as claimed in claim 15, further comprising a feature (c), wherein an adjustment travel in the range from 0.005 to 0.015 mm is achieved during one revolution of the setting screw.

22. The remaining tool as claimed in claim 15, wherein the cutting insert is pressed in the circumferential direction against a tip seat with the aid of a clamping element.

23. The reaming tool as claimed in claim 22, wherein the cutting insert is held in a form-fitting manner by the clamping element.

* * * * *